Sept. 18, 1945.   C. H. ESHBAUGH ET AL   2,385,068
METHOD OF DEHYDRATING FOOD CONCENTRATES
Filed Aug. 14, 1942
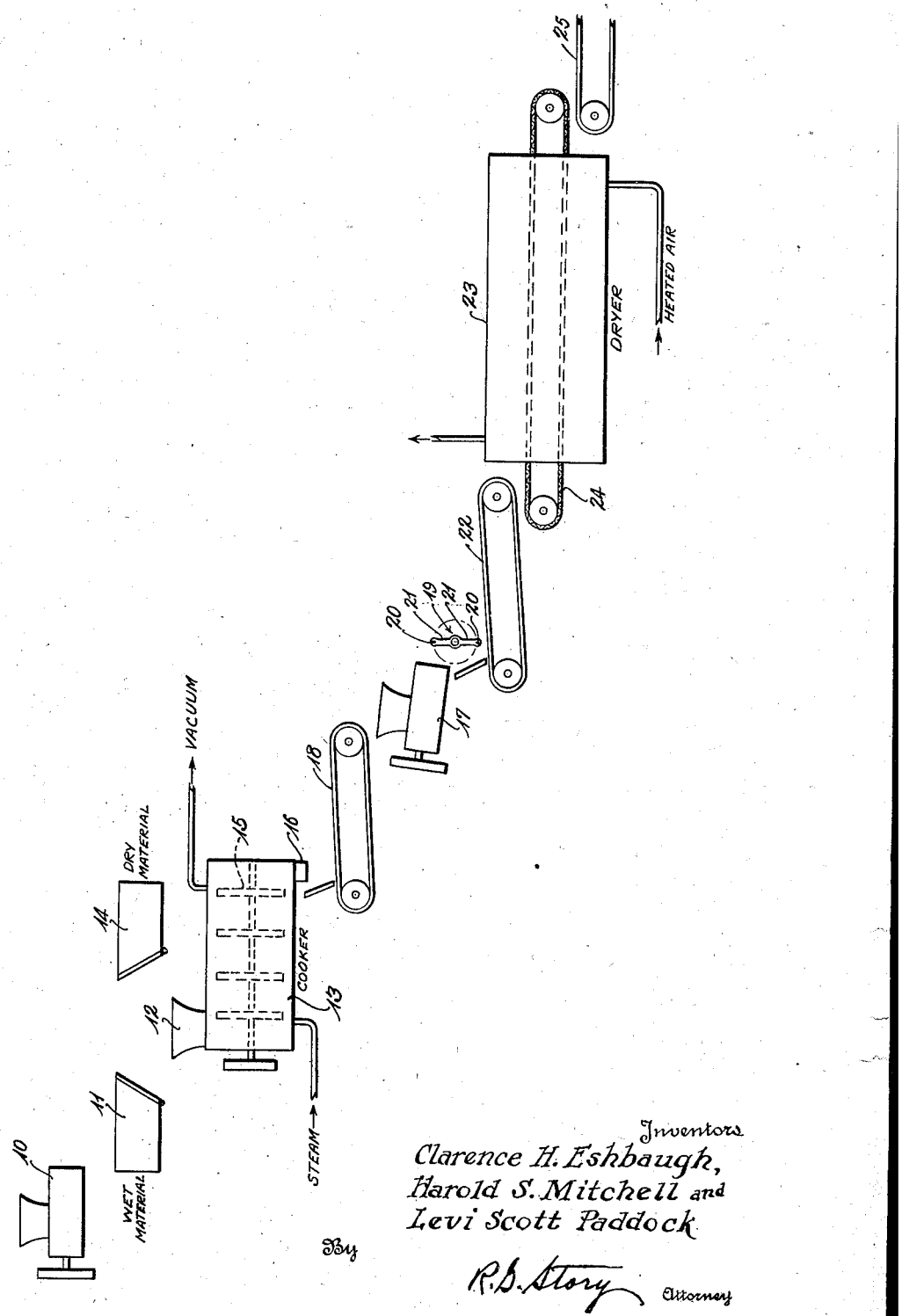
Inventors
Clarence H. Eshbaugh,
Harold S. Mitchell and
Levi Scott Paddock
By
R. D. Story   Attorney Patented Sept. 18, 1945

2,385,068

UNITED STATES PATENT OFFICE 2,385,068

METHOD OF DEHYDRATING FOOD CONCENTRATES

Clarence H. Eshbaugh, Harold S. Mitchell, and Levi Scott Paddock, Chicago, Ill., assignors to Industrial Patents Corporation, Chicago, Ill., a corporation of Delaware Application August 14, 1942, Serial No. 454,788

7 Claims. (Cl. 99—2)

This invention relates to a method of making a dehydrated food concentrate and more particularly to the production of food concentrates containing meat and cereal or other food products which are stable and capable of being packed in fiber containers for shipment and storage without deterioration.

While the present application will be directed primarily to the preparation of a dehydrated animal food such as dog food it is understood that other types of food including those for human consumption can be treated in substantially the same manner to produce a stable desiccated product.

In accordance with the present invention meats and cereal products are comminuted and mixed so as to produce a relatively uniform mixture containing only sufficient water to form a relatively thick paste. Such a paste usually contains more than 60 per cent moisture. This may be accomplished by grinding the wet ingredients such as meat, fresh vegetables, etc., and introducing the resulting wet mixture into a body of finely divided cereal or other relatively dry products with sufficient agitation to prevent lumping, and form a substantially uniform mixture. The resulting mixture then has its temperature raised to a temperature approaching that of the boiling point of water at which time a vacuum is rapidly applied to the mixture in order to remove water and condition the mixture for extrusion and further dehydration. The conditioned mixture is then extruded while containing a predetermined amount of water, for example about 30 to 40 per cent depending upon the nature of ingredients, into rods or strips which are then dried by bringing the same into contact with a current of heated air. The moisture content at the point of extrusion is predetermined depending upon the general nature of the material since extrusion is most satisfactory within rather narrow limits of moisture content.

It has been found that by the steps of controlling the amount of moisture in the material during the cooking operation as well as temperature thereof, rapidly applying a vacuum when the temperature of the material being cooked reaches a predetermined temperature and extruding material with a definite water content and thereafter drying the same by heated air, an extremely stable product capable of being readily hydrated and free from a water resisting outer skin or surface layer may be produced.

It is therefore an object of the present invention to provide an improved method of producing a dehydrated food concentrate which can be readily rehydrated.

Another object of the invention is to provide an improved process of dehydrating food concentrates containing meats and cereals or other food products in order to produce a product which is stable and capable of being packed in fiber containers for shipment and storage.

A further object of the invention is to provide an improved process of making a dehydrated food concentrate in which the material is partially dried under vacuum conditions and partially dried by a current of warm air in order to produce a product which is readily hydratable.

A still further object of the invention is to provide an improved process of dehydrating food concentrates in which the moisture content and size of extruded particles are controlled in order to enable the particles to be dried by a current of warm air without forming a moisture resisting skin or surface coating thereon.

Other objects of the invention will appear in the following description of the preferred embodiment of the invention made in connection with the attached drawing which is a schematic diagram of apparatus suitable for carrying out the present process.

Products made in accordance with the present invention will ordinarily contain 25 to 50 per cent of protein which may be derived from animal and/or vegetable sources, although in general a substantial quantity of animal protein is employed. The food product will also ordinarily contain between 5 and 15 per cent fat which will include the fatty material present in any meat employed as well as any vegetable or animal fat added to the product or present in the vegetable material. The product will also ordinarily contain between 25 and 50 per cent cereals derived from wheat, corn, oats, barley, rye, rice, soybeans, cottonseed, peanuts or any other cereal capable of yielding a nutritious food product. Such cereals may contain in addition to carbohydrates an appreciable quantity of proteins and in some instances fatty constituents. In addition the product may contain such ingredients as minerals, vitamins, preservatives such as antioxidants, coloring matter, flavoring material, etc., in amounts ranging between approximately 5 and 10 per cent. The above proportions are not to be considered as limiting but are intended to merely serve as a guide for illustrating the type of materials capable of being handled by the present invention.

In carrying out the process of the present invention two mixtures are preferably first prepared, one containing the wet or fluid materials such as hashed meat with or without curing materials, wet bone meal, hashed fresh vegetables, liquid oil, etc. Any antioxidants will ordinarily be added with the wet ingredients, for example by dispersing the same in liquid oil, an example of an antioxidant which has been found to be particularly effective being gum guaiac. The wet mixture may be ground or hashed in a conventional food chopper or hasher such as that indicated at 10 in the drawing. The hashed wet mixture from the hasher 10 may be received and weighed in a container 11 which is arranged to be emptied into a hopper 12 forming part of a cooker 13. The dry mixture in ground or powdered form made up of such ingredients as milk powder, dried bone meal, soy flour, wheat grits, or other cereal, salt and other minerals, etc., may be prepared in any suitable manner and weighed in the container 14. Both the wet mixture and the dry mixture can be prepared and delivered into the containers 11 and 14 respectively during a cooking operation on a batch of materials previously prepared and undergoing cooking processes in the cooker 13. After the cooker 13 has been emptied of the previous batch, the dry mixture is preferably first discharged from the container 14 through the hopper 12 into the cooker 13.

The cooker 13 is preferably provided with agitating blades shown in dotted lines at 15 and the wet material from the container 11 is then gradually discharged into the cooker 13 during agitation of the dry mixture therein by agitating blades 15. It is obvious that any convenient means of agitation may be employed. The amount of moisture in the wet material is preferably carefully controlled so as to produce a resulting mixture in the cooker 13 which is the nature of a thick paste which is readily flowable but which does not contain sufficient water to render it thinly liquid or "soupy." Such a moisture content usually falls between 50 and 80 per cent. In case too much water is present in the wet materials, a quantity of the dehydrated end product of the process in divided form can be added back to the mass in the cooker so as to reduce the percentage of water in the material in the cooker. This material can be originally mixed in dry form with the dry mixture in the container 14 or can be added to the cooker 13 after mixing the wet and dry mixtures in order to bring the material in the cooker to the proper consistency. It is apparent that the wet mixture can be incorporated into the dry mixture in a separate mixer and the resultant mixture delivered into the cooker. However, the cooking step of the present invention is preferably carried out during agitation of the mixture so that the cooker can also be employed to form the initial mixture. By adding the wet materials to the dry materials, as described above, during agitation of the dry materials a substantially uniform mixture is produced and the formation of lumps prevented.

When a substantially uniform mixture has been produced in the cooker 13, heat is applied thereto a raise the temperature of the materials during agitation. The preferred heating medium is steam which can be introduced either directly into the cooker or into a heating jacket (not shown) surrounding the cooker. The temperature is preferably raised as rapidly as possible and for large scale operations the temperature can be elevated to substantially 200° F. in approximately one-half hour. This time may vary over wide limits depending upon the amount of frozen stock added or upon the temperature of ingredients in general. For any given mixture it has been found that there is a relatively critical temperature to which the material should be raised and that this temperature will ordinarily fall within the range of 180° to 210° F. This cooking may be carried on at atmopsheric pressure, water vapor or steam displacing the air from the cooker.

When the desired temperature has been reached the cooker is closed to the atmosphere and a vacuum rapidly produced therein so as to bring the pressure in the cooker to approximately 10 to 15 inches of water. The maximum temperature reached during the cooking operation prior to the application of vacuum is largely determined by the effect upon the starch content of the materials being processed. It has been found that as the temperature increases the starch content begins to swell and hydrolyze. At the temperature at which this begins to occur or just prior thereto, which temperature depends upon the nature of the mixture and the amount of water contained therein and which ordinarily falls between 180° and 210° F., the vacuum is rapidly applied. The rapid application of the vacuum quickly lowers the temperature by evaporation of water, reduces the water content of the material, prevents swelling and hydrolyzing of the starch and opens up the product to condition it for subsequent drying in a current of warm air. If the action upon the starch is allowed to continue for too great a length of time it has been found extremely difficult to carry on the subsequent step of drying in a current of warm air as a skin or surface coating of starch or protein or both tends to form on the particles preventing rapid evaporation of moisture and also preventing rapid rehydration of the dried product.

The agitation and heating under vacuum is continued until a predetermined moisture content has been obtained in the material in the cooker. This moisture content will vary somewhat with different mixtures but will ordinarily lie between 33 to 45 per cent moisture, and this moisture content will ordinarily be obtained within one to two hours on large scale operations. Too much moisture will produce extruded rods or strips which are too dense for proper drying whereas too small a moisture content will cause the material to crumble upon extrusion. Also too great a moisture content favors the formation of a skin or surface coating preventing evaporation of water and resisting rehydration as described above. The temperature during the vacuum treatment in the cooker will ordinarily be that which approximately corresponds to the boiling point of water at the pressure in the cooker. This temperature is preferably maintained by indirect heating, for example by employing a steam jacket upon the cooker.

At the completion of the cooking and vacuum treatment the material is discharged from the cooker 13 through a discharge outlet 16 and delivered into an extruding mechanism 17. The extruder 17 may be generally similar in structure to the hasher 10 except that the discharge orifices are preferably smooth instead of being serrated or rifled as in the case of certain types of conventional food choppers or hashers. A conveyor 18 is shown for delivering the material from the cooker into the extruder 17. This conveyor may, however, be eliminated and the material from the cooker delivered directly into the extruder 17. The material having a proper moisture content as described above is extruded in the form of rods, tubes, strips or any other convenient form from the extruder 17 and is preferably cut into relatively short lengths, for example lengths of from ½ to 1¼ inches, by a cutting device diagrammatically illustrated at 19, which cutting device may have a plurality of wires 20 carried by arms 21 so that the wires follow a cylindrical path adjacent the discharge from the extruder 17. The extruded cut particles may fall upon conveyor 22 which carries them to a dryer 23.

It has been found that the rods or strips extruded from the extruder 17 should have a thickness falling within a rather critical range in order to provide for adequate drying without producing a hard surface on the dried particles. The operative range of thickness has been found to lie between approximately $\frac{3}{32}$ and $\frac{1}{8}$ of one inch. A thickness or diameter much less than $\frac{3}{32}$ of an inch results in a dried product which is too hard to be easily rehydrated with water after the subsequent drying operation and particles having a thickness or diameter much greater than $\frac{1}{8}$ of an inch are too large for economical drying. Also, the outer layers of the particles are overdried before the inner portions thereof are sufficiently dehydrated. Another important consideration for reducing the water content of the material being extruded to between 33 and 45 per cent is that the extruded particles remain separated from each other, do not adhere to the conveyor 22 or to the screens preferably employed in the dryer 23.

The dryer 23 preferably includes an endless member 24 made up of perforated screens which receive the extruded and cut particles from the conveyor 22. The particles are preferably distributed substantially uniformly over the screens and are carried through the dryer 23 by said screens. Suitable dryers are well known and will not be described in detail. In such dryers a current of heated air is blown upwardly through the upper flight of the screens 24 and the resulting dried product may be delivered onto a conveyor 25 which may carry the same to a packing stage not shown. The air temperature may vary from 130° to 300° F. depending upon the type of dryer and nature of the mix. Certain foods require very low temperatures whereas others are not harmed by elevated temperatures. In any case the temperature of drying air is not allowed to proceed to a point where ebullition of water would explode the desired form. Sufficient water is removed from the material in the dryer to produce rigid particles having enough mechanical strength to withstand packing and shipping without crumbling. The material delivered from the dryer 23 has been found to be extremely stable and has an open texture enabling the same to absorb water readily so that it may be reconstituted with water to form a hydrated food product. Its moisture content may vary from 5 to 15 per cent depending upon its ability to retain moisture. Although it is preferred to cut the extruded rods or strips into particles before the final drying operation, it will be apparent that the material may be run through the dryer in rod or strip form and broken into particles after the drying operation.

In the preparation of dog food, the meat portion of the food product will ordinarily be derived from such meats as lungs, hearts, kidneys, tripe, beef gullets, trimmings, etc., and the cereals may include such meal or flour or other materials as are commonly obtained from soyabeans, wheat, oats, peanuts, cottonseeds, linseeds and the like. Hashed vegetables, fats, etc., may be also added as well as seasoning materials, antioxidants, coloring and flavoring materials, etc. The same process may, however, be employed for producing high quality products such as those intended for human consumption in which case the meat entering into the product will be of high quality although certain organ meats such as liver and hearts form a desirable part of food for human consumption because of their high nutritional values and vitamin content. In any case a stable, highly nutritious product which can be employed in its dehydrated state or easily rehydrated by mixture with water is produced and is of such nature that it can be packed in fiber containers for shipment and storage.

While we have disclosed the preferred embodiments of our invention it is understood that the details thereof may be varied within the scope of the following claims.

We claim:
1. The process of preparing for preservation a cooked, comminuted, normally wet, starch granule and protein containing food; comprising cooking and partially dehydrating the food under conditions which preclude the hydrolysis of any substantial portion of the starch granules; said cooking step proceeding at atmospheric pressure for a substantial period of time of up to approximately one-half an hour until a temperature within the range of from about 180° F. to 210° F. is reached, then immediately thereafter subjecting the cooking food to a vacuum of a degree equal to at least ten inches of water to accomplish said partial dehydration without substantial hydrolysis of the starch granules, and said partial hydrolysis proceeding until the product has a moisture content of from approximately 33 percent to 45 percent by weight; comminuting the partially dried and cooked foot to a particle size such that the individual particles will dry evenly throughout and without drying to such a consistency as will interfere with rehydration, and then completing the drying of the comminuted product.

2. The process of cooking, dehydrating, and comminuting a normally wet food product containing protein matter and an appreciable portion of starch in granular form; comprising cooking the food product at atmospheric pressure for a substantial period of time of up to approximately one-half an hour by raising its temperature up to a range of from 180° F. to 210° F. at which the starch granules begin to hydrolyze; immediately thereafter subjecting the food product to a vacuum of a degree equal to at least ten inches of water to cool the heated food product rapidly by evaporation of moisture in order to prevent the hydrolysis of starch granules and effect partial drying of the product to a moisture content of from approximately 33 percent to 45 percent by weight and without formation of a surface skin; forming the partially dried food product into sticks so that the drying may be completed; and the stick size being selected to be so small that the stick will dry evenly throughout and yet to be so large that the food product will not be dried to such a hard consistency as will interfere with rehydration whereby a dried protein and starch containing food is produced having a homogeneous texture and which by reason thereof may be rapidly rehydrated.

3. The process of cooking, dehydrating, and comminuting a normally wet food product containing protein matter and an appreciable portion of starch in granular form; comprising cooking the food product at atmospheric pressure for a substantial period of time of up to approximately one-half an hour by raising its temperature up to between 180° to 210° F. at which temperature the starch granules begin to hydrolyze, immediately thereafter subjecting the food product to a vacuum to a degree equal to at least ten inches of water to cool the heated food product rapidly by evaporation of moisture in order to prevent the hydrolysis of starch granules and effect partial drying of the product to have a moisture content of from approximately 33 percent to 45 percent by weight and without formation of a surface skin; forming the partially dried food product into sticks so that the drying may be completed; and the stick size being selected to be so small that the stick will dry evenly throughout and yet to be so large that the food product will not be dried to such a hard consistency as will interfere with rehydration whereby a dried protein and starch containing food is produced having a homogeneous texture and which by reason thereof may be rapidly rehydrated.

4. The process of cooking, dehydrating, and comminuting a normally wet food product containing protein matter and an appreciable portion of starch in granular form comprising cooking the food product by raising its temperature up to that at which the starch granules begin to hydrolyze, immediately thereafter subjecting the food product to a vacuum to cool the heated food product rapidly by evaporation of moisture in order to prevent the hydrolysis of starch granules and effect partial drying of the product without formation of a surface skin; forming the partially dried food product into sticks so that the drying may be completed; and the stick size being controlled to be within a size range of from approximately $\frac{3}{32}$ to $\frac{9}{32}$ of an inch in diameter so that the stick will dry evenly throughout and yet will not be dried to such a hard consistency as will interfere with rehydration whereby a dried protein and starch containing food is produced having a homogeneous texture and which by reason thereof may be rapidly rehydrated.

5. The process of cooking, dehydrating, and comminuting a normally wet food product containing protein matter and an appreciable portion of starch in granular form; comprising cooking the food product by raising its temperature up to that at which the starch granules begin to hydrolyze; immediately thereafter subjecting the food product to a vacuum to cool the heated food product rapidly by evaporation of moisture in order to prevent the hydrolysis of starch granules and effect partial drying of the product without formation of a surface skin; extruding the partially dried food product into stick form; severing the extruded stick at spaced points so that drying may be completed; and the diameter of the extruded stick being controlled to be within a range of from $\frac{3}{32}$ to $\frac{9}{32}$ of an inch so that the stick will dry evenly throughout and yet will not be dried to such a hard consistency as will interfere with rehydration whereby a dried protein and starch containing food product is produced having a homogeneous texture and which by reason thereof may be rapidly rehydrated.

6. The process comprising cooking, dehydrating, and comminuting a food product formed of a mixture of protein matter in proportions of from 25% to 50% by weight, fat in proportions of from 5% to 15% by weight, and cereal containing starch in granular form in proportion of from 25% to 50% by weight; said protein matter being predominantly derived from meat products; cooking the food product by raising its temperature up to that at which the starch granules begin to hydrolyze; immediately thereafter subjecting the food product to a vacuum to cool the heated food product rapidly by evaporation of moisture in order to prevent the hydrolysis of starch granules and effect partial drying of the product without formation of a surface skin; continuing the vacuum drying step until the food product has a moisture content of from between 33% to 45% by weight; extruding the partially dried food product into stick form; severing the stick form at spaced intervals so that drying may be completed; and the stick size being selected to be so small that the stick will dry evenly throughout and yet to be so large that the food product will not be dried to such a hard consistency as will interfere with rehydration whereby a dried protein and starch containing food product is produced having a homogeneous texture and which by reason thereof may be rapidly rehydrated.

7. The process comprising cooking, dehydrating, and comminuting a food product formed of a mixture of protein matter in proportions of from 25% to 50% by weight, fat in proportions of from 5% to 15% by weight, and cereal containing starch in granular form in proportion of from 25% to 50% by weight; said protein matter being predominantly derived from meat products; cooking the food product by raising its temperature up to between 180° to 210° F. at which temperature the starch granules begin to hydrolyze, immediately thereafter subjecting the food product to a vacuum to cool the heated food product rapidly by evaporation of moisture in order to prevent the hydrolysis of starch granules and effect partial drying of the product without formation of a surface skin; continuing the vacuum drying step until the food product has a moisture content of from between 33% to 45% by weight; extruding the partially dried food product into stick form; severing the stick form at spaced intervals so that drying may be completed; and the stick size being controlled to be within a range of from approximately $\frac{3}{32}$ to $\frac{9}{32}$ of an inch in diameter so that the stick will dry evenly throughout and yet will not be dried to such a hard consistency as will interfere with rehydration whereby a dried protein and starch containing food product is produced having a homogeneous texture and which by reason thereof may be rapidly rehydrated.

CLARENCE H. ESHBAUGH.
HAROLD S. MITCHELL.
LEVI SCOTT PADDOCK.